Aug. 3, 1965  R. A. COVINGTON, JR., ETAL  3,198,866
METHOD AND APPARATUS FOR PRODUCING PLASTIC TUBULAR MEMBERS
Filed Feb. 6, 1962  4 Sheets-Sheet 1

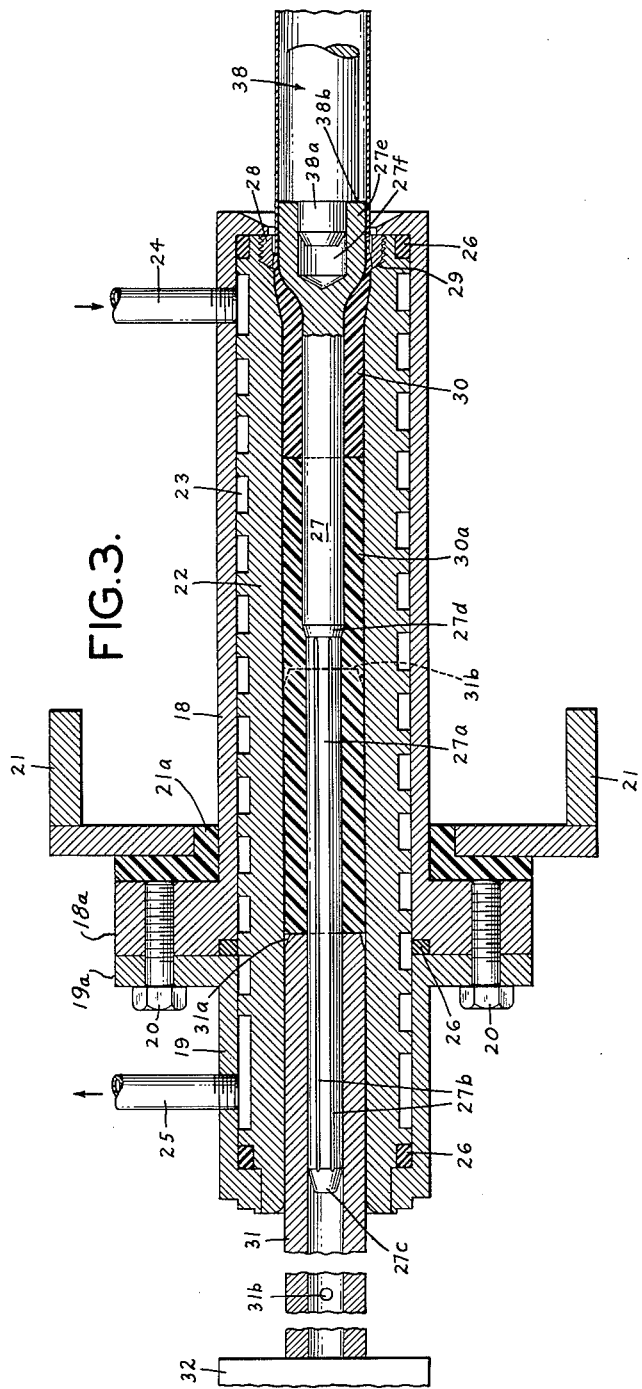

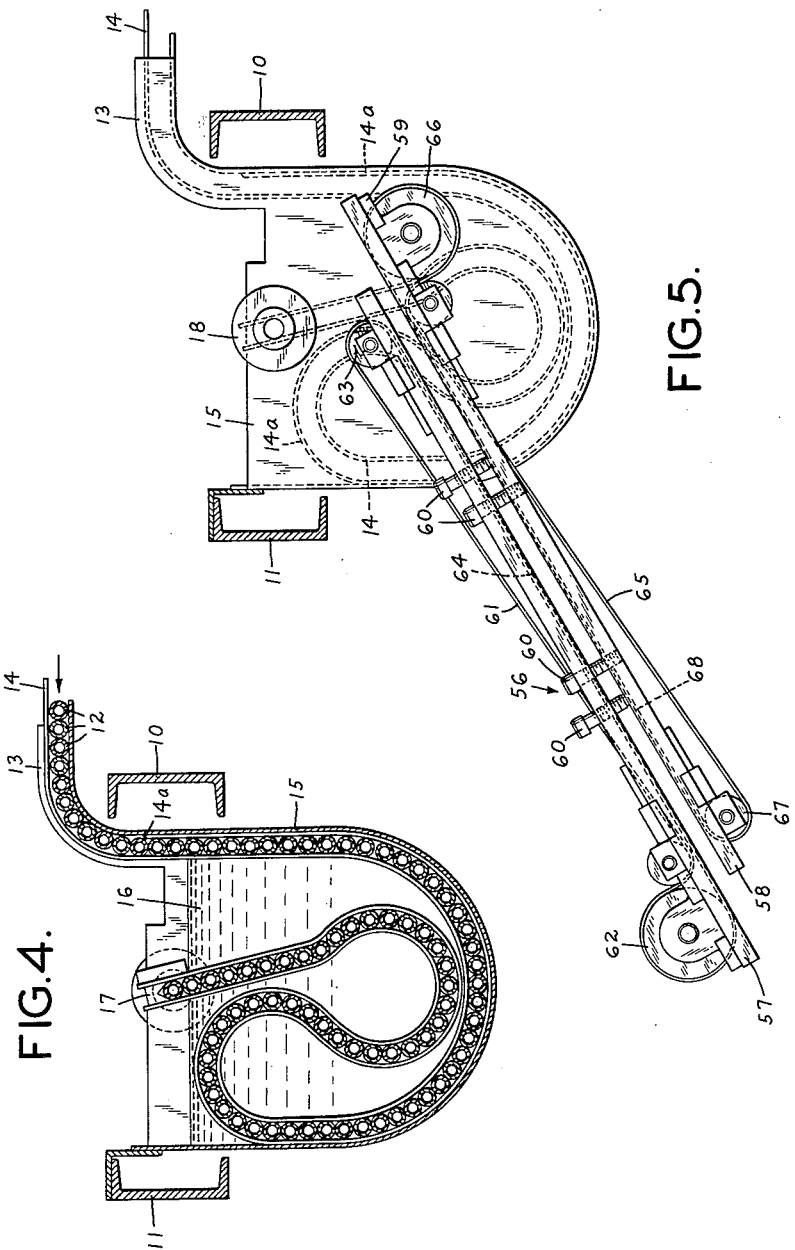

United States Patent Office 3,198,866
Patented Aug. 3, 1965

3,198,866
METHOD AND APPARATUS FOR PRODUCING PLASTIC TUBULAR MEMBERS
Robert A. Covington, Jr., Wilmington, Del., and Benjamin K. Daubenspeck, Stratford, George R. Eckstein, Fairfield, and Justin H. Whipple, Milford, Conn., assignors to Remington Arms Company, Inc., Bridgeport, Conn., a corporation of Delaware
Filed Feb. 6, 1962, Ser. No. 171,366
19 Claims. (Cl. 264—297)

This invention relates to a new method and apparatus for producing from a highly crystalline plastic material, tubular members which have a relatively high tensile strength in the longitudinal or axial direction and transversely of said direction, and also having dimensional stability and high resistance to stress cracking. While a variety of different plastic materials may be used in accordance with the invention, it is particularly desirable to employ a high density, highly crystalline, linear polymer of ethylene which may, if desired, contain small percentages of other olefins in the polymer. The preferred plastics for use in accordance with the invention are of the character set forth in the pending application of Covington et al. Serial No. 37,598, filed June 21, 1960, now Patent No. 3,103,170, granted September 10, 1963. The tubular members produced in accordance with the invention are particularly well suited for use as shotshell casings, but they may be used for other purposes where relatively short lengths of tubing having good dimensional stability and resistance to stress cracking are required or highly desirable.

A primary purpose of the invention has been to provide a method and apparatus capable of producing tubing of the character mentioned above, on a commercially practicable basis, with a minimum capital expenditure for the apparatus required and a minimum floor space requirement for such apparatus. It has been found that a very substantial saving in capital expenditure and floor space has been made possible through the special features of the invention, and the quite compact apparatus required to carry out the invention has been found capable of sufficiently high speed operation to meet the great and increasing demands for tubular members of the character mentioned, on an economical basis.

Various methods and types of apparatus have been proposed heretofore for the production of tubular members of the character indicated, but these have been subject to the objection that an excessive capital expenditure has been involved in providing a system capable of supplying the demands for such tubular members. This is partly due to the cost of the extensive equipment required and further to the great amount of floor space required. Certain of the methods heretofore proposed for the purposes of the present invention have involved serious limitations upon the speed of operation of the apparatus employed, so that the overall cost of production of the desired tubing has been excessive. All of these objections to previously suggested methods and apparatus have been overcome by the present invention.

In accordance with the invention, tubular slugs are first produced, as by extruding a thick walled, continuous tubing from the desired plastic material and the cutting of such tubing into slugs of desired short lengths. Such slugs are then pushed through a die structure under a suitable force to increase their mean diameter and their length, under conditions leading to cold working to bring about molecular orientation both longitudinally and transversely of the axis of the tubing. This treatment of the initial slugs has been found to result in the production of tubing having the desired tensile strength in all directions, the desired dimensional stability, and great resistance to stress cracking. These results are all achieved, in accordance with the present invention, through the use of compact apparatus which may be economically produced, assembled and operated.

Slugs of the character mentioned above may be automatically fed from a source of supply, such as a hopper or the like, at ordinary room temperature and may be rapidly brought to the desired elevated temperature for the efficient performance of the cold working steps. The slugs may be brought in a properly heated condition into a position in alinement with a suitable die structure, to be hereinafter more fully described, and it may then be forced into and through the die structure by means of a hydraulically operated ram. The arrangement is such that on each operation of the ram a slug is introduced into the die passage and the forward end of the new slug then engages the rearward or upstream end of the preceding slug to force the latter through the expanding and orienting passages of the die structure. As the ram is retracted, the slug which has thus been introduced remains in the position of the immediately preceding one, i.e. where it is about to emerge from the die structure but remains completely within the latter until the next succeeding slug forces it along.

It has been found that by maintaining the slug, and the resulting thinner walled and elongated tube, at proper temperatures the resulting tubes will have their molecules highly oriented, both longitudinally and transversely, and will be dimensionally stable and highly resistant to stress cracking, without the need of any further heat treatment.

A special feature of the invention is the provision of a supporting or retaining member for a mandrel forming the male member of the die structure. This retaining member is shifted into and out of operative position during each cycle of operation of the apparatus. It is necessary to have it in its active position, of course, when the ram is forcing the foremost slug through the shaping and orienting passages, and for this purpose it must be capable of resisting a thrust up to about 10,000 pounds. When the ram is being retracted, the retainer is shifted axially away from the die structure and withdrawn from the expanded and oriented tubing, which is thus automatically stripped from the retainer and permitted to drop by gravity. During this period the last-introduced slug, which is now in the region of the shaping passage serves to retain the mandrel centrally located within the die structure.

It has been found desirable to subject the worked and molecularly oriented tubes to a rolling treatment after they have been discharged from the retainer and while they are being cooled. As will be appreciated, the work applied to the slug as it is forced through the die structure, at the rapid rate desired, will serve to increase the temperature of the slug over that at which it is introduced, and as will be explained, the slug is preferably heated in the die by indirect heat from a further heating medium. The rolling treatment serves to eliminate undesirable bending and other distortion of the tubes that may occur if they are simply dropped, while hot, into a receptacle. For this purpose it has been found particularly effective to deliver the tubes, as they are discharged from the mandrel retainer, into a passage provided between a pair of conveyor belts, or it may be between a singe belt and a plate. The belts are so arranged that a passage is formed between opposed runs of the two belts, said runs of the two belts being substantially parallel and spaced apart a distance slightly less than the outside diameter of the final tubes. This imparts a slight squeezing action to the tubes, which increases somewhat their surface contact with the two belts. The belts are so driven that the opposed runs forming the passage are advanced in opposite directions and at somewhat different speeds, the run which advances away from the point at which the tubes are delivered into the passage being moved at a greater speed than the run of the other belt which moves in the opposite direction. This arrangement, through its rolling action imparted to the tubes, has been found to deliver the tubes into a receptacle at a temperature at which it will maintain its cylindrical form and without danger of subsequent distortion or development of objectionable curvature or bending in relation to the longitudinal axis of the tubes. As the tubes are advanced by the conveyor belts the cooling action is preferably speeded, as by directing air streams between the active runs of the belts. The discharged tubes, which are straight and dimensionally stable, may be readily cut into sections highly suitable for use as shotshell casings, or the like.

In the commercial production of the desired tubes, the apparatus employed is preferably provided with suitable electrical and pneumatic controls for insuring the proper timing of the operation of the various units for performing the necessary operations to convert the initial slugs from their relatively thick walled and short tubular form into the thin walled, elongated tubes of larger mean diameter desired as the final end product. By appropriate timing of the operation of the various devices embodied in the overall unit, and by the provision of appropriate heating and cooling means at various points in the system, it may be insured that during the continuous operation of the system a uniform series of final tubes may be produced from a series of slugs supplied to the system at a substantially uniform, and quite rapid, rate. Also the various controls will serve to stop the operation of the unit in the event that any malfunctioning should occur in the operation of any of the various devices employed.

Briefly summarizing the nature and mode of operation of the unit contemplated in accordance with the invention, it comprises a hopper into which the short, thick walled slugs may be intermittently or continuously fed, and from which the slugs may be discharged for successive delivery, by suitable means, to the receiving end of a heater. As the slugs are advanced intermittently in a continuous series through the heater their temperature is increased to the desired point for subsequent processing. This temperature is preferably substantially below the crystalline melting point of the plastic of which the slugs are formed. For high density polyethylene, with or without small percentages of other olefins in the polymer, the final temperature may suitably be between 150° F. and 210° F. Preferably the heat is supplied to the slugs by passing the latter through a hot lubricant bath which thus supplies a lubricant to the outer and inner surfaces of the slugs.

The foremost slug in the series thus advanced through the heater is forced against a detaining member which serves to aline said slug with the opening in a suitable die structure. When the foremost slug is so positioned a ram which is alined with the die opening is operated to force the slug into the die opening. In the preferred embodiment of the invention it has been found desirable to provide a die structure which requires two reciprocations of the ram to force a slug into the die and then complete its passage through and out of the die. Thus the first slug of a series is fed into the die to a position in which the forward end of the slug is about to emerge from the discharge end of the die. At this time the forward or downstream end of the slug will be within the shaping passage of the die structure, which is formed by a surrounding female die element, of annular cross-section, and a mandrel having an appropriately shaped head. The die element and the mandrel are so formed as to provide a shaping passage of any of the types disclosed in the Covington et al. application, Serial No. 141,394, filed September 28, 1961, now abandoned, and replaced by a continuation-in-part application, Serial No. 182,152, filed March 14, 1962, or of other suitable forms adapted to bring about longitudinal and transverse working of the slug. On the next succeeding stroke of the ram another slug will be forced into the die opening against the rearward or upstream end of the first slug and will force the latter out of the die structure and leave the forward end of the second slug at the discharge end of the die. The following slugs will successively function in the same manner, so that there will always be one slug within the shaping passage of the die structure as the ram is retracted.

At times during the operation of the apparatus there is no means for supporting or retaining the mandrel in the die, other than the slug which has been forced into the position in which its forward end is about to emerge from the downstream end of the die. In initially starting up the equipment, it will therefore be desirable to carefully introduce a slug into the die structure, with manual assistance, in order to assure the proper alinement of the mandrel within the female die member before the apparatus is put into actual operation. Once the equipment has been put into operation a slug will remain in the shaping passage of the die structure, and this serves to retain the mandrel in proper position within the female die. If the apparatus is shut down for any substantial period of time, so that the slug remaining in the die is allowed to cool, care should be exercised to see that the slug is reheated to at least 150° F. before the ram is operated to force it out of the die. This heating can be accomplished by circulating hot liquid around the female die in the manner to be described. Such heating can be accomplished in about 20 minutes. For relatively short shutdowns the normal circulation of the heating fluid will simply be continued.

During the operation of the apparatus a special mandrel retainer is alternately shifted into and out of active position. This retainer comprises a longitudinally movable rod-like member having a portion at its free end which is adapted to enter a cavity in the downstream end of the mandrel and retain this in properly centered position and also to resist the thrust force which is transmitted to the mandrel as the ram forces successive slugs through the unit. After each slug has been forced through the shaping region of the die and has been fully discharged from the die, the retainer member is retracted through a sufficient distance to withddraw it completely from the formed tube so that the latter may drop onto a suitable conveyor for further treatment and final discharge. Means cooperating with the retainer member abuts the end of the worked tubing and assists in stripping the latter from the retainer to insure proper discharge of the tubing. In the preferred embodiment of the invention the mandrel retainer is shifted longitudinally, in the manner explained, by pneumatic means. Also pneumatically operated means is provided for operating a clamp which serves to hold the mandrel retainer in its active position, in such a way as to resist the thrust force which is imparted to the mandrel during the operation of the ram.

With the foregoing objects and features of the invention in view, a preferred embodiment of the same will now be described in detail in connection with the accompanying drawings, in which:

FIG. 3 is a section through the axis of a die structure, and related parts, which is embodied in the apparatus of FIG. 1;

FIG. 4 is a vertical sectional view through a slug heating chamber embodied in the apparatus;

FIG. 5 is a vertical sectional view taken along the line 5—5 of FIG. 1;

Figure 1:
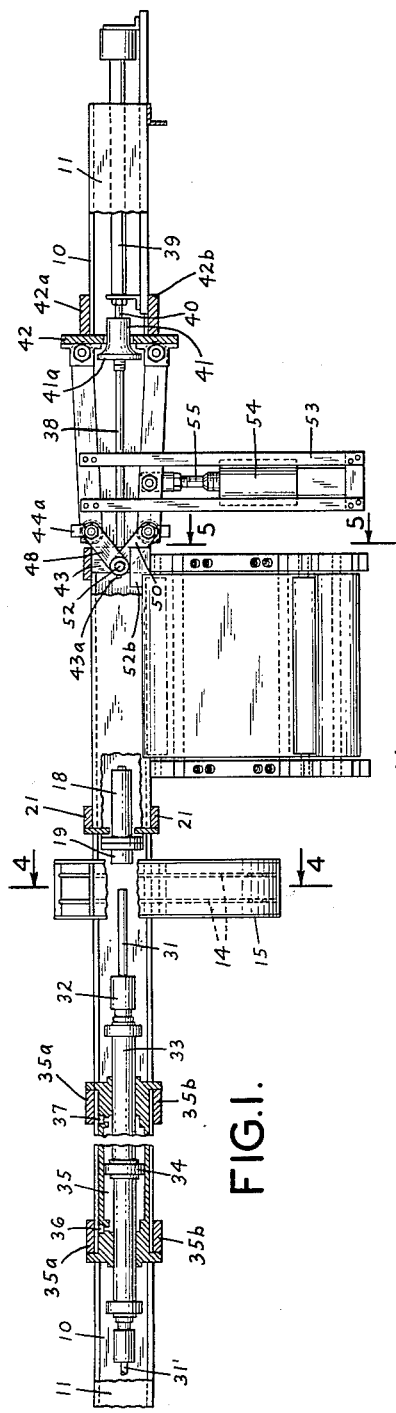
FIG. 1 is a view, partly in elevation and partly in vertical section of the basic elements of apparatus constructed to carry out the invention.

Referring now to the drawings, a preferred embodiment of the invention is disclosed, but only the various devices discussed above are shown, and these are illustrated more or less schematically. No attempt has been made to accurately correlate the relative dimensions of the various devices illustrated. The auxiliary apparatus, including the power supplying means and the various controls for insuring proper automatic operation of the apparatus have been omitted. Also, a showing of most of the supporting structure has been omitted, since this may be of any conventional and desired form. In FIG. 1 there is shown in elevation, lengthwise of the apparatus, the various devices brought into successive operation during the continuous operation of the apparatus to produce worked and oriented tubing at a rate of about 30 tubes per minute. The layout is such that the apparatus may be duplicated, in reverse relationship at the left end of the structure shown in FIG. 1. Thus a single hydraulic ram may be employed for alternately operating upon slugs in the apparatus shown and then upon slugs in the reversed duplicate of this apparatus connected with the left end of that shown in FIG. 1. It has been found that such a dual unit can be produced which will require a quite limited amount of floor space, i.e. about 16 feet long and about 6 feet in depth or width, including the space required for various auxiliaries. The overall height of the apparatus may be approximately 8 feet.

In FIGS. 1, 2, 4 and 5, there is shown a part of the frame structure including spaced parallel channel members 10 and 11 which serve to support the various devices to be described.

As best shown in FIG. 4, the preformed slugs 12, which may be used for the production of shotshell casings are introduced successively into a channel member 13. The side walls of this channel member are spaced apart a distance slightly greater than the length of a slug. Between the walls of the channel member there are provided two or more bent rods or stiff wires 14 which follow a serpentine coures and are spaced from the bottom of the channel a distance only slightly greater than the diameter of the slugs. For the production of 12 gauge shotshell casings it has been found desirable to employ tubular slugs formed of high density polyethylene, having an outside diameter of about 11/16 of an inch and an inside diameter of about 5/16 of an inch. Any suitable means may be employed for feeding the slugs into the channel described. For example, they may be fed one at a time from a hopper and then delivered by a suitable conveyor to the receiving end of the channel, at the right side of FIG. 4. A reciprocatory pusher may be employed to urge successive slugs from the conveyor into the channel, and the arrangement is such that the slugs are firmly held stationary within the channel at the time the leading slug is forced by the ram into the die structure.

The channel 13, with its spaced guide wires or rods 14, serves to deliver the slugs into an open top tank 15 containing a suitable liquid 16 for heating the slugs in their passage along a serpentine path. Within the tank or chamber 15 a second group of rods or wires 14a, bent into the same serpentine path as the rods 14, forms the opposite side of the guide passage, from the lower end of channel 13, through which the slugs are forced. There is thus provided a serpentine passage through which the slubs are forced, with free access of the heating liquid to all portions of the slug being advanced. The heating liquid employed may be of any suitable character, but it has been found most satisfactory to employ a lubricant such as butoxy poly (oxyethylene-oxypropylene) glycol with an average molecular weight of approximately 1500. This serves the double purpose of supplying heat, to raise the temperature of the slugs from normal room temperature to the desired temperature of about 150° F. to 210° F., and of supplying lubricant to the inner and outer surfaces of the slugs. Any suitable means may be provided within the tank 15 for heating the liquid, maintaining it at such temperature and circulating it within the tank, as may be required to insure delivery of the slugs in a uniformly heated condition at a temperature within the range specified into a position in alinement with the ram and the axis of the die structure. The serpentine passage thus formed is of such length that in the operation of the apparatus at a speed of 30 cycles per minute, for the production of tubing for 12 gauge shotshell casings, a slug will be placed in heat exchange relation with the liquid 16 during a period of at least 2¼ minutes. This has been found adequate to insure raising the temperature of the slug as a whole to the desired point. For other gauge tubing the time required may be less or greater. At the outlet end of the serpentine passage there is provided a V-grooved stop member 17 which serves to position the leading slug in proper alinement with the ram and die opening. As explained above, the leading slug is firmly retained in this position during the period in which the ram is operated to force the slug into the die opening.

Figure 2:
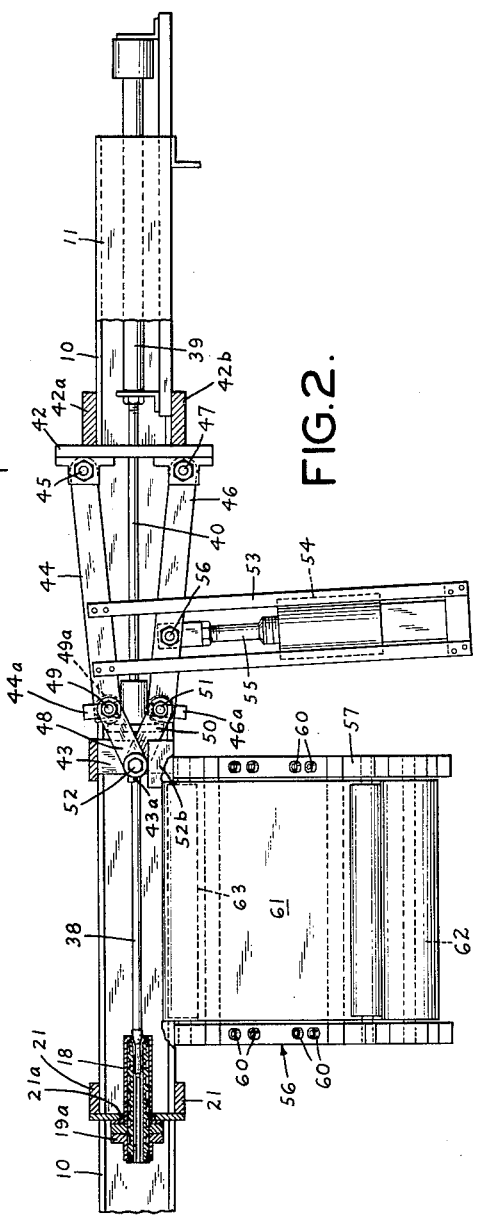
FIG. 2 is a slightly enlarged view of a portion of the apparatus shown in FIG. 1, with certain parts shown in a different position assumed in the course of operating the apparatus.

In FIG. 3 there is shown a preferred form of the die structure to be incorporated in the apparatus. This is enclosed by an outer shell or cylinder 18 and a cap 19, these elements having outwardly extending flanges 18a and 19a which are firmly secured together by bolts 20. The location of this die structure in relation to the heating chamber 15, and more particularly the slug which is being positioned for the next stroke of the ram, is shown in FIGS. 1, 2 and 5. As indicated in FIGS. 1 and 2, the die structure is held firmly in a fixed position on the frame of the apparatus by brackets 21, or the like, secured to the channel members 10 and 11. Between the flange 19a and vertically extending portions of the bracket 21 is a flanged sleeve 21a which surrounds the shell 18 to hold the latter firmly in place. Member 21a is formed of a strong insulating material, such as that sold under the name "Micarta." It provides good mechanical support and minimizes heat transfer from the die to the machine frame. Within the cylinder 18 and cap 19 there is provided a female die element 22. The die element 22 has a snug fit in relation to the inner walls of the cylinder and cap, and its outer surface is provided with a spiral or helical groove 23 through which a liquid heating medium, such as water, may be circulated. The heated water may be introduced through a pipe 24 adjacent the discharge end of the die structure, and it may be discharged through a pipe 25 adjacent the inlet or upstream end of the die structure. It will be understood that the water will be heated to a suitable temperature, preferably between 150° and 210° F., before it is introduced into the helical passage by means of the pipe 24 and before it is recirculated again. O-rings 26, or other suitable sealing means is preferably provided between the cap and cylinder. Thus, the escape of the heating medium is prevented.

Within the die element 22 there is mounted a mandrel 27 which preferably has a reduced diameter portion 27a adjacent its upstream end provided with a series of longitudinal grooves 27b which permit the drainage of any excess lubricant which is carried into the die structure by the slugs which have passed through the heating chamber. This lubricant drains back into the chamber 15 through the bore of the ram and a vent opening 31b through the bottom of the wall of the ram. It is desirable to have this vent opening as far toward the left end of the mandrel as possible. The lubricant which is supplied to the inner and outer surfaces of the slugs in the heating chamber serves to reduce the frictional resistance to their movement through the die structure, and thus reduces the required thrust force of the ram. At its extreme left end the mandrel is provided with a conical portion 27c which facilitates the initial introduction of a slug into the annular passage between the mandrel and the die element 22. For the same purpose, the receiving end of the female die is also rounded off, as shown in FIG. 3. At a point intermediate the ends of the mandrel there is preferably provided a frusto-conical surface 27d which merges into a slightly greater diameter portion of the mandrel. This increase in diameter should be about .040″, and may be slightly more. The provision of the sloping shoulder 27d serves to strip excess lubricant from the inner surface of the slug and also assists in holding the mandrel in proper position. It is important that slugs having a maximum inside diameter, within permissible tolerances, have a tight fit around the mandrel and against the inner wall of the die in the region toward the right (FIG. 3) of the shoulder 27d. Also it is important that slugs having a minimum inside diameter, within the minmum tolerance range are capable of being readily pushed on to the smaller diameter portion of the mandrel toward the left of shoulder 27d. This is because it is undesirable to require any great amount of force to be applied to the hot slug in introducing it into the annular passage between the die and mandrel. Adjacent the discharge end of the die structure, the mandrel is provided with an enlarged head 27e which has an outer surface that merges into the smaller diameter portion of the mandrel without any abrupt change of direction. As shown, it may suitably present an ogee curve in cross-section. The adjacent portion of the die element 22 has its inner surface sloping outwardly to provide the desired increase in the mean diameter of the passage between the mandrel and the die element, but its slope is gentler than that provided on the adjacent portion of the mandrel so as to gradually decrease the cross-sectional area of the annular passage. In some instances the outward sloping of the die wall may be negligible, so that the outside diameter of the final tubing may be substantially the same as that of the slug. Nevertheless the change in mean diameter is such as to bring about a desirable transverse working. Thus there is always brought about the desired transverse and longitudinal working and molecular orientation of the plastic material as it is forced through the die unit. The enlarged head of the mandrel is preferably provided with a cylindrical cavity 27f to receive a retaining member in the manner to be explained. Fitted into the right or downstream end of the die element 22 is a ring 28 having screw threaded engagement with the die element and having an inner surface adjacent the upstream side of the ring arranged to form a smooth extension of the surface of die element 22 along which the plastic is forced. Adjacent the downstream side of the ring it is provided with alternate shallow grooves and projections, parallel with the axis of the die, which serve to provide a ribbed or corrugated effect to the outer surface of the final tubing. It has been found important to accurately and smoothly finish the cooperating surfaces 29 of the die element 22 and ring 28 and to otherwise insure against any tendency to produce roughening of the outer surface of the tubing as it is forced through this region. As shown in FIG. 3, the corrugating ring or insert has the inner portion of its bore slightly sloped toward the axis of the die, in the downstream direction, to eliminate the danger of causing wrinkles and other surface defects. Toward the same end, all edges of the die and ring over which the plastic is forced are slightly rounded.

In FIG. 3 there is shown a slug 30 which has been partially forced through the shaping passage formed between the die element and mandrel 27. It is illustrated as being forced along by a second slug 30a which is being subjected to the thrust of a hollow ram 31. The latter, it will be understood, has forced the slug 30a from its position against the stop member 17 of the heating chamber 15 and has passed it over the reduced portion 27a of the mandrel to the position indicated. The ram 31 will continue to advance toward the right under a thrust of, say, 6,000 lbs. until its forward end reaches the position indicated in broken lines at 31b. At this time the forward or right end of the slug 30a will be just ready to emerge from the discharge end of the die unit. As shown, the forward end of the ram 31 is preferably provided with an inwardly tapered surface 31a to facilitate the introduction of the ram into the bore of the die element 22. This tapered surface also helps to avoid the shearing of small portions out of the cooperating ends of the slugs as they are pushed into the die.

As shown in FIG. 1, the hollow ram 31 is connected by a fitting 32 with a piston rod 33 to which is secured a piston 34 within a cylinder 35. This cylinder is firmly secured to the frame members 10 and 11 by means of cross members 35a and 35b. The piston and cylinder constitute hydraulically operated means for forcing the ram in opposite directions. The fluid used for operating the device, which may suitably be a light oil, is introduced through a port 36, when the piston is to be driven toward the right, and is discharged through a port 37. When it is desired to drive the piston in the opposite direction the fluid under pressure is delivered into the cylinder through the port 37 and discharged through the port 36. In the preferred embodiment of the invention suitable pressure producing and controlling means (not shown) are provided so that the piston may be driven at different speeds and under a different force at different times in its cycle of operation. The arrangement is preferably such that the piston is shifted toward the right under a relatively low force but at a relatively high speed by the introduction of the driving fluid under a comparatively low pressure of say, 80 lbs. per square inch, but at a rapid rate, until the ram 31 has engaged the slug, which is being retained in set position by the block 17, and has introduced this partially or completely into the die. Automatc means then comes into play to introduce the driving fluid under a substantially higher pressure, say 1200 lbs. per square inch, but at a slower rate, as the ram 31 forces the slug partially through the die unit. During this latter period a thrust of about 6000 lbs. is applied to the ram as the result of the application of pressure of about 1200 lbs. per square inch to the five square inch effective area of the piston 34. Should it be desired, in the production of particular tubing, to increase the thrust force of the ram to 10,000 lbs., the fluid may be introduced into the hydraulic cylinder under a pressure of 2000 lbs. per square inch. At a later time the ram will be retracted by reversing the direction of flow of the operating fluid. If the apparatus is set up to operate only upon a single series of slugs provided in the portion of the apparatus illustrated, the retraction of the piston may take place almost immediately after the ram has completed its movement toward the right, and it may be so restored by the introduction of the driving fluid under a relatively low pressure but at a rapid rate. On the other hand, if duplicate equipment is provided toward the left of that illustrated, in the manner explained above, the piston will be driven toward the left in the same manner as described in relation to its movement toward the right, so that a ram 31′ at the opposite side of the hydraulic system may engage and force a slug from a related series passing through another heating chamber similar to the chamber 15. Assuming that the equipment at the left is ready for the application of the thrust force to the ram as soon as the latter has completed its movement toward the right, the control system may cause the piston to move toward the left at a rapid rate, and under the relatively low force mentioned, until the slug at the left has been introduced into its die and then at a slower rate but higher pressure to extrude the leading slug from the die of the apparatus at the left.

Referring now to FIGS. 1, 2 and 3, there is shown a mandrel retainer 38 which has a reduced portion 38a which has been introduced within the cavity 27f of the mandrel by the time the ram is forcing the slugs through the die structure. The retainer 38 is provided with a shoulder 38b which abuts against the end of the mandrel, and the arrangement is such that the retainer will resist any movement of the mandrel toward the right under a thrust up to 10,000 lbs. that may be applied to the slugs. Retainer 38 is connected with a piston rod 40 of a pneumatically operated cylinder and piston device 39. Mounted on the retainer 38 and piston rod 40 is a spool or sleeve 41 having a radially extending flange 41a which merges along a smooth arc on its right side into the cylindrical portion of the sleeve. This sleeve, moreover, is preferably capable of some axial adjustment in relation to the members 38 and 40 to insure the accurate cooperation of the left end of the retainer with the mandrel to hold the latter in the desired position within the female die element. Before the ram 31 is brought into operation to force a new slug into the die unit, the retainer 38 will be shifted toward the left by the pneumatic member 39 from the position shown in FIG. 1 to that shown in FIG. 2. The piston rod 40 and at least a part of spool 41 may pass through a suitable opening in a bracket 42 which is firmly secured to the frame members 10 and 11 with the aid of cross members 42a and 42b. Retainer 38 is guided by a bushing 43a mounted in a fixed block 43 to maintain the retainer in accurate alinement with the die unit. This block is suitably mounted on the frame in a fixed position, through the aid of cross members 43d, and it is adapted to receive bushings, preferably formed of bronze, which have different internal diameters to guide retainers of differing diameters. The bushing also serves as a stripper means for engaging the end of the elongated tubing as the retainer is retracted.

Figure 6:
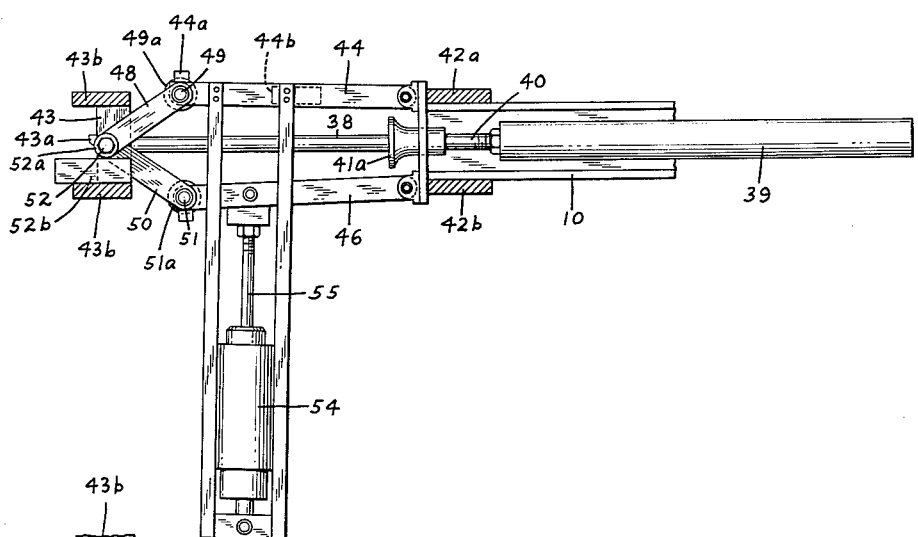
FIG. 6 is a side elevational view, partly in section, showing certain details of the clamping means for the retainer.
Figure 7:
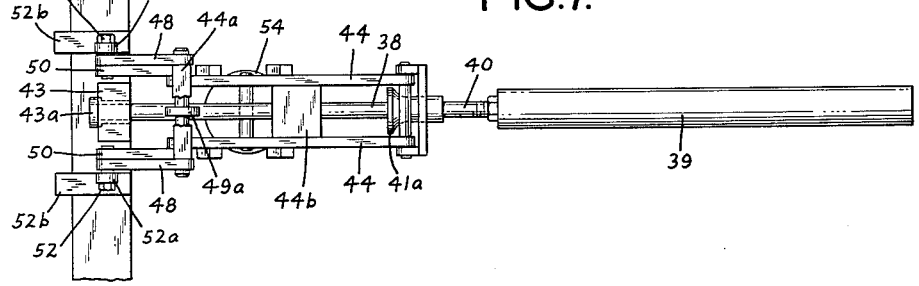
FIG. 7 is a plan view of the parts shown in FIG. 6.

For holding the retainer 38 firmly in the position shown in FIG. 2, there is provided a pneumatically operated clamping device. This comprises an upper pair of parallel arms 44 (only one of which is shown) mounted for rocking movement about the axis of a shaft or stud 45 carried by a rigid bracket 42 secured to the frame structure of the apparatus. Cooperating with the arms 44 is another pair of arms 46 (only one of which is shown) mounted for rocking movement about the axis of a shaft or stud 47 carried by the bracket 42. At their forward ends, each of the pairs of arms 44 and 46 has a cross member (44a and 46a respectively) which serves to retain the free ends of the arms of each pair in properly spaced relation. These cross members are U-shaped and have portions which extend, respectively, downwardly along the outer side faces of the arms 44 and upwardly along the inner faces of the arms 46. The arms 44 may also be held in spaced relation at an intermediate point by a block 44b (FIG. 7). Parallel links 48 are pivotally connected with the left ends of the arms 44 by a bolt 49. Similarly, links 50 are pivotally connected with the left ends of the arms 46 by means of a bolt 51. At their opposite ends each of the links 48 is connected with the adjacent link 50 by a bolt 52 which carries a roller 52a arranged to roll along a track 52b. At their mid-points the bolts 49 and 51 carry cam follower type rollers 49a and 51a, respectively (FIG. 6). These rollers cooperate with the curved surface between the sleeve and flange of the spool 41 to firmly hold the same against axial movement when the retainer is in its leftmost position, shown in FIG. 2. A frame structure 53 secured to the arms 44 carries a cylinder 54 of a pneumatic operating device, the piston rod 55 of which is connected by a bolt 56 with the arms 46. By introduction of air under pressure into the lower end of the cylinder 54, the piston with its piston rod 55 will be forced upwardly, to rock the arms 46 in a clockwise direction, and the frame structure 53 and the arms 44 will be drawn downwardly.

When air under pressure is introduced into the upper end of the cylinder 54, the reverse operation will take place and the arms 44 will be moved upwardly and the arms 46 downwardly from the position shown in FIG. 2, to the position shown in FIG. 1. The introduction of air into the cylinder 54 may be either manually or automatically controlled in properly timed relation to the operation of the pneumatic device 39. Thus, when the latter has been operated to shift the retainer 38 toward the left to engage and hold the mandrel firmly in position, the pneumatic cylinder 54 will be operated to cause the clamping arms 44 and 46 to shift into the position shown in FIG. 2. After the ram has forced a new slug into the die structure, and has forced the immediately preceding slug through the shaping passage of the die structure and on to the retainer 38, the pneumatic cylinder 54 will be operated in the reverse direction to restore the arms 44 and 46 into the position shown in FIG. 1. This serves to unclamp the retainer so that the pneumatic device 39 may be operated to retract the retainer 38 to the position shown in FIG. 1.

As the retainer 38 is retracted, the elongated tubing which has been delivered onto the retainer will be stripped from the latter by engagement of the right end of the tubing with the bushing 43a. This permits the right end of the tubing to drop and causes the left end of the tubing to drop away from the die structure.

In the preferred embodiment of the invention, the successive sections of tubing which are thus removed from the retainer 38 and the die structure drop onto a conveyor structure 56 (FIG. 2). As best shown in FIG. 5, the conveyor structure involves a pair of rigid support members 57 and 58 which carry two conveyor belts in suitably spaced relation. These conveyor belt supporting members are connected with the frame structure of the apparatus by means of a bracket 59. The distance between the opposed faces of the two members 57 and 58 may be suitably adjusted by means of set screws 60. As shown in FIG. 5, two of these, at each side of the conveyor belts, may have screw threaded engagement with the member 58 and have heads engaged with the upper surface of the member 57. The other two set screws 60, provided at each side of the conveyor belts, have screw threaded engagement with the member 57 and have their lower ends in engagement with the upper surface of the member 58. A conveyor belt 61, carried by the member 57, passes around a pulley 62 at the lower end of the structure and around a pulley 63 at the upper end of the structure. The bottom run 64 of this belt is arranged to slide along the undersurface of a rigid plate carried by the member 57. On the lower member 58 there is provided a conveyor belt 65 the upper end of which is passed around a pulley or drum 66 and its lower end is passed around a pulley or drum 67. The upper run 68 of this belt is parallel with the run 64 of the upper belt and slides along a rigid plate carried by the member 58. The runs 64 and 68 of the two belts are parallel and spaced apart a distance, determined by the adjustment of the set screws 60, which is slightly less than the outside diameter of the tubing that is discharged onto the conveyor. Any suitable means (not shown) may be provided for driving the two belts. The arrangement is preferably such that the two runs 64 and 68 of the belts are advanced in opposite directions, the run 64 being advanced downwardly and the run 68 upwardly. The rate of downward advance of the run 64 is slightly greater than the upward rate of advance of the run 68. As a result of the movement of the belts, the sections of tubing are rolled and gyrated and they are squeezed slightly for better surface contact with the belts, and are advanced downwardly due to the greater speed of movement of the run 64. In lieu of the double belt arrangement, it has been found possible to achieve the same result through the use of a single belt 64 which squeezes the tubing slightly against a stationary plate forming the other side of the passage. The belt is then moved at a somewhat slower rate. As the sections of tubing are advanced downwardly by the conveyor they are preferably subjected to the cooling action of blasts of air directed from suitable fans into the space between the two runs 64 and 68 or the run 64 and the stationary plate. It has been found desirable to so operate the conveyor belts that each section of tubing remains for about one minute between the belts, and during this period the temperature of the tubing is dropped to a point at which distortion in the further handling of the tubing is eliminated. The resulting tubing has been found to maintain its straightness and to have dimensional stability, so that even when later placed in boiling water the tubes will maintain the same dimensions which they have at the time they are discharged from the conveyor system. Also, due to the rolling action imparted to the tubing the latter, in its cooled condition, has been found to maintain its straightness in its axial direction and its truly cylindrical form. Tubing which has not been subjected to the cooling, squeezing, rolling and gyrating action, which is imparted to it as it advances along the conveyor system, has been found to assume bends and other undesirable characteristics. However, when properly treated and cooled during their advance by the conveyor system the tubes are found to have all of the desired properties. The departure from the desired contour, in the absence of the rolling treatment during cooling, is apparently due in part to distortions imparted to the tubing by extraneous forces while the tubing is still hot, and in part to the difficulty of completely eliminating certain defects, such as tool eccentricity, slug wall eccentricity and lack of uniform preheating of the entire wall of the slug. These factors have been found to result in some distortion of the tubing, in the course of cooling unless prevented by the rolling technique.

In the construction and operation of the apparatus described above, it has been found desirable to stay within rather definite limits of dimensions, operating conditions and the like.

The profiles of the die member and the mandrel in the shaping region or working area may be of a number of different forms, of the character disclosed in said Covington et al. application Serial No. 141,394. It is important that no burrs or sharp edges are left which may result in marking the tubing as it is being shaped. As has already been mentioned in this connection, it has been found desirable to provide the corrugating insert 28 with a lead-in for the plastic which is inclined slightly to the axis of the die unit in the manner shown in FIG. 3. The left ends of the projections on this member, which provide the corrugating effect on the outer surface of the tubing, should be rounded and not blunt in order to avoid tearing of the tubing. Thus, in experiments which have been conducted, it has been found that all edges presented to the advancing plastic should be rounded in the shaping and forming region of the die structure. Also it has been found, for example, that the use of a mandrel profile having a 10° outwardly flaring angle, without merging radii, tends to have a harmful effect, particularly in the way of creating wall eccentricity. The use of a 35° outwardly flaring angle profile has been found to increase the required extrusion pressure or thrust to the point where it has been difficult to overcome it and operate at a satisfactory speed. The annular passage between the mandrel and die should be such that its cross-sectional area should not increase as it progresses downstream. It has been found that a profile on the mandrel which is of ogee form having radii of about half the maximum diameter of the bulbous portion of the mandrel produces very good results. Thus in producing tubing for 12-gauge shotshell casing purposes the radii should preferably be .375". Any abrupt change in the profile in the region of the corrugating insert has been found to cause wrinkles and other surface defects. It is also important to have the corrugating insert, as nearly as possible, concentric with the die bore. Eccentricities, in this relationship, of .0015" or less have been found permissible and to give good tube straightness. However, poor tube straightness has been obtained with dies having such eccentricities of .004" or more.

It has also been found important to have the die structure of sufficient length to accommodate two or more slugs at a time. If the overall length of the die is less than two slug lengths, so that in the operation of the ram a slug remaining in the die structure has its downstream end extending substantially beyond the discharge end of the die, the uniformity of the final tubing, throughout its length, is difficult to maintain, because different portions of a tube will be formed during two successive cycles of the ram. However, the slug remaining in the die should have its downstream end extending slightly beyond the adjacent end of the mandrel so that the tube which has just been completed will readily fall by gravity as the retainer is fully retracted. Also it is objectionable to have the full thrust force of the ram applied to the new slug being introduced, and to have this transmitted to the forwardmost slug until the new slug is completely within the die passage. Earlier application of the full thrust force has been found to result in shearing off a portion of the slug at the mouth or entrance of the die.

Another consideration which has been found important is that the mandrel should not be of such a length that its upstream end projects outwardly from the die, since this will interfere with the feeding of the slugs. It should preferably terminate a slight distance inwardly of the receiving end of the die so that the new slug is completely on the mandrel before extrusion pressures are reached, and the entrance to the die as well as the upstream end of the mandrel should be such as to insure proper introduction of the slug by the ram into the annular passage between the die and mandrel.

Care should be exercised in the production of the slugs to insure a smooth outer surface and accuracy in the outside dimension and concentricity of the bore through the slug. A permissible tolerance in the outside diameter of the slug has been found to be ±.008" in relation to the die bore. Slugs of greater diameter require too much force to insert them into the die and have a tendency to bulge and rupture, thus bringing about a misfeed. If the outside diameter of the slug is smaller than .008" less than the die bore, there is a tendency to carry along an excess amount of lubricant which is not effectively removed from the slug surface. Such excess lubricant, particularly when unevenly distributed, leads to wrinkling of the tube surface. Furthermore, excess lubricant, if retained by the slug as the latter is discharged from the die structure, leads to an objectionable spattering of the lubricant, particularly if air becomes entrapped with it. In some instances the entrapped fluid may lead to bulging of the end of the tube and thus require scrapping of a portion of a tube.

It has also been found desirable to maintain the wall thickness of the slugs within relatively narrow limits, i.e. within a ±.005" tolerance from the selected value. This insures that the cross-sectional area of the wall of a slug of given diameter will be reduced at least 4:1 in the production of the final tubing with a resulting longitudinal tensile strength of about 18,000 p.s.i. If the longitudinal tensile strength drops below 17,000 p.s.i., the product is scrapped as unacceptable. The indicated values are given with respect to tubing formed of polyethylene sold under the name Hi Fax 1800. The work ratio may be varied within rather narrow limits, and when other plastics are used in forming the slug a somewhat greater variation in work ratio may be desirable. The same observation applies with respect to the various tolerances in slug dimensions.

Another factor to be observed in connection with the slugs is that the eccentricity of their walls, i.e. variation in wall thickness, should be held to a minimum. It should not exceed .010". A slug with this amount of eccentricity between its inner and outer surfaces will result in tubing having about .004" eccentricity.

Some latitude is permissible in the location of the mandrel in relation to the surrounding die so long as certain conditions are observed. These conditions are set forth in detail in the above-mentioned Covington et al. application Serial No. 141,394. For example, the mandrel must be inserted far enough into the die to bring about a gradual reduction in the cross-sectional area of the annular space between the mandrel and the die adjacent the discharge end of the die structure, and to bring about sufficient working to create the desired tensile strength and desired wall thickness. So long as these conditions are met the mandrel may be inserted further, if desired, and by doing so some control can be maintained over the surface quality of the tubing. However, if the mandrel is held by the retainer 38 in a position too far into the die, a slightly wrinkled appearance has been found to occur, this apparently being due to excessive frictional resistance to movement of the plastic along the mandrel, particularly at the commencement of such movement. The wrinkling thus produced is primarily at the forward end of the tubing, which indicates that it is due to the fact that the enlarged cylindrical portion of the head of the mandrel, when inserted too far into the die, presents an ironing surface which is of greater area than is desirable. On the other hand, if the mandrel is positioned too far toward the right (FIG. 3), it has been found that a rough appearance may be created on the outer surface of the tube at its leading end. Possibly this is due to the excessive work load imposed upon the corrugating portion of the die, where most of the reduction in the cross-sectional area of the passage will then take place.

After the desired position of the mandrel in the die has been selected, suitable adjustment of the ram sleeve 31 may be made by means of the connecting fitting 32. This adjustment should be such that the second slug within the die, as the ram is being advanced, will be pushed toward the discharge end of the die just to a sufficient extent to cause the extruded tube formed from the first slug to clear the end of the mandrel, so that it may drop free when the retainer 38 is retracted.

In certain experiments conducted in accordance with the present invention, making use of slugs formed from a high density linear polyethylene sold under the trade designation Hi Fax 1800, the following observations have been made. While the preheating of the slugs in the lubricant bath and in the die structure may, as stated above, be such as to maintain the slugs in the die at any temperature between 150° F. and 210° F., at the maximum extrusion speed available, some differences have been noted in the final product depending upon the particular temperature selected. When operating temperatures are permitted to fall below 150° F. some loss in dimensional stability of the final tubing has been found to occur. Above 150° F. no shrinkage of tubing occurs when the latter is placed in boiling water. Tubing can be oriented at temperatures above 210° F., but it has been found that partial spirals occur at the end of the tubing, on some occasions, when such higher temperatures are employed. Moreover, as the temperature is increased the danger of slug distortion due to "hot spots" in the lubricant bath increases. This has lead to some misfeed problems in the insertion of the slugs into the die.

Also it has been noted that the outside diameter of the tube is affected by variations in the preheat temperature. The higher the temperature, the larger will be the outside tube diameter. This amounts to roughly .001" change in diameter for each 15°–20° F. change in the lubricant bath temperature. The wall thickness of the tubing is also affected, with higher temperatures producing a heavier wall. This, however, amounts to less than .001" over the entire specified temperature range. When the temperature of the preheat bath, or of the die, is reduced, higher extrusion forces are required.

The length of time during which the slugs are retained in the lubricant bath, before delivery to the die structure, has been found to be critical with regard to tube straightness. Experiments have shown that when the slugs are immersed in the bath for less than 2.25 minutes prior to delivery to the die structure, the straightness of the final tubing is adversely affected. This is probably due to the fact that the slugs are not evenly heated throughout when a shorter soaking time in the bath is provided.

Another factor which has been found to have some effect upon the final tubing formed is the speed at which the slugs are extruded from the die structure. In extruding a slug, of the character hereinabove described having a length of 3¾", into tube 16" long, it has been found that this may be accomplished in approximately 0.7 second with equipment of the type hereinbefore described. Some experiments have been conducted in which lower speeds of extrusion have been employed, to determine the effect of such reduced speeds. These experiments have shown that reduced speeds have a beneficial effect upon the sensitivity of the process to particles of contamination which may be present in the plastic. Also reduced speeds have shown to improve the tensile strength of the final tubing, with the same amount of reduction in the cross-sectional area from that of the original slug. Furthermore, the wall thickness of the tubing has been found to decrease with reduced speed, and this probably accounts for the increased tensile strength because of the area working which apparently takes place. Determinations made in connection with the experiments above discussed showed an increase in the longitudinal tensile strength of the tubing to be about 1,000 p.s.i. when the extrusion of 16" tube was accomplished in approximately two seconds. Under the same conditions the wall thickness of the tubing was found to decrease to the extent of between .001" and .0015". However, these slight improvements in the end result have not been found sufficient to justify a reduction in the speed of operation of the apparatus. In fact, the two seconds extrusion time would hardly be practicable to meet the requirements of commercial production. Another drawback of the reduced speed of extrusion is that it has been found to require a greater slug preheat temperature to obtain a dimensionally stable final tube. Thus, the tubing formed at the two second extrusion rate, with the die and the preheat bath at a temperature of 180° F. was found to shrink to the extent of about 2% when the final tubing was immersed in boiling water. On the other hand, it has been found that in operating at reduced speeds it is possible to heat the slugs to temperatures above 210° F. without encountering the spiral defects mentioned above.

The mandrel retainer 38 should be of slightly smaller outside diameter than the enlarged cylindrical portion of the head of the mandrel. This is to provide a suitable clearance between the inner wall of the extruded tube and the outer surface of the retainer. If such clearance is not provided, it has been found that there is a tendency to cause the tubing to wrinkle as it is advanced along the retainer. The desirable difference between the two diameters varies, depending upon the straightness of the lead end of the tube. Satisfactory running conditions have been found to exist with as little as .030" clearance between the inner wall of the tube and the outer surface of the retainer, in the production of tubing adapted for use in forming 8 gauge shell casings. So long as adequate clearance is provided to prevent gripping of the tubing on the retainer shaft, it is best to provide a minimum amount of clearance, in order to insure maximum tube straightness.

Tubing formed in accordance with the present invention has been found to have great resistance to stress cracking. This property is significantly greater than has been found with respect to tubing subjected to transverse and longitudinal working in other ways.

In the use of the invention for the production of shotshell casings, it has been found desirable to utilize slugs formed from highly crystalline, linear polyethylene, with or without small percentages of other olefins in the polymer, of the character set forth fully in the Covington et al. application, Serial No. 37,598, hereinbefore mentioned. For the production of short sections of tubing for other purposes, requiring high tensile strength, dimensional stability and resistance to stress cracking, other crystalline polymeric materials of the character specified in said Covington et al. application may be employed.

While a preferred embodiment of the invention has been described in considerable detail, it will be understood that various modifications may be adopted in connection with the various aspects of the invention, within the scope of the appended claims.

What is claimed is:

1. A method of producing a succession of dimensionally stable tubular members which comprises:
   (a) forming thick-walled, elongated tubular slugs of substantially uniform wall thickness and of greater wall thickness, less length and no greater outside diameter than the tubular members being produced from a linear polyolefin composed to the extent of at least 90% of polyethylene and which is between about 60 and 85% crystalline,
   (b) heating said slugs to a temperature between about 115° F. and 210° F. at which they may be readily deformed upon the application of a suitable force thereto but substantially below the crystalline melting point of said polyolefin,
   (c) successively pushing said slugs while at such a temperature through a confined passage of annular cross-section by the application of a force to one end thereof,
       (i) said passage having a portion which increases in its mean diameter and decreases in the cross-sectional area in relation to these dimensions of the slugs to bring about corresponding changes of dimensions of the wall of each slug as it is forced through said passage,
   (d) and discharging the slugs in their modified tubular form from said confining passage.

2. A method as set forth in claim 1 in which said slugs are heated to the desired temperature by passing the slugs in direct contact with a heating fluid for a sufficient period of time to bring all portions of each slug to a temperature of at least 150° F., said time of contact being at least 2.25 minutes, said heating fluid being a liquid which serves as a lubricant for the surfaces of the slug in relation to the surfaces defining said passage.

3. A method as set forth in claim 2 in which said lubricant is a glycol and excess lubricant is removed from the outer and inner surfaces of the slugs as they are introduced into and forced through the passage of annular cross-section.

4. A method as set forth in claim 1 in which:
   (a) said confined passage being in part formed by a mandrel that is normally unsupported, maintaining the mandrel in its centralized position by successive slugs being continuously pushed through said confined passage in such a manner as to always maintain one of said slugs in the portion of said passage which increases in its mean diameter and decreases in its cross-sectional area,
   (b) discontinuing the pushing of said slugs when one of the same has its downstream end adjacent the discharge end of said passage, and
   (c) repeating said steps to cause a succeeding slug to force said one slug out of said passage and to introduce said succeeding slug into the position previously assumed by said one of said slugs.

5. A method as set forth in claim 1 in which heat is supplied to said slugs as they are being forced through said passage to maintain the same at a temperature at which they may be readily deformed but substantially below the crystalline melting point of the plastic.

6. A method as set forth in claim 1 in which each of said slugs is forced through said portion of said passage which increases in its mean diameter and decreases in cross-sectional area within a period of less than one second.

7. Apparatus for producing plastic tubing that has been worked in directions both longitudinally and transversely of the axis thereof, which comprises:
   (a) a die structure having an elongated passage therethrough which is of annular cross-section,
       (i) the initial portion of said passage having an outer wall of substantially greater diameter than the inner wall thereof,
       (ii) the portion of said passage adjacent the discharge end of said die having a gradually increasing mean diameter and gradually decreasing cross-sectional area,
   (b) a hollow ram alined with said die passage having an annular cross-section which is substantially the same as that of the initial portion of said passage,
   (c) means for reciprocating said ram under a substantial force between a position in which the forward end of said ram is spaced a substantial distance from the receiving end of said die structure to a position well within said die structure but inwardly of the discharge end thereof,
   (d) means for heating thick-walled, elongated tubular slugs of substantially uniform wall thickness and of plastic material, and
   (e) means for presenting successive heated slugs from said heating means into a position between said ram and said die structure in alinement with the passage through the latter when the ram is retracted,
   (f) said means for reciprocating said ram causing the successive slugs so delivered to be forced into and through the die structure.

8. Apparatus as set forth in claim 7 in which:
   (a) said die structure has a sleeve and a mandrel within said sleeve to provide said passage,
   (b) a rod is alined with said mandrel and adapted to engage and retain said mandrel against the force exerted by said ram as the latter forces a slug into and through said passage,
       (i) said rod being adapted to receive the tubing formed upon extrusion of a slug, and
   (c) means is provided for retracting said rod and removing the tubing therefrom after completion of the extrusion of a slug.

9. Apparatus as set forth in claim 8 in which said rod is adapted for reciprocation, and means for reciprocating said rod into mandrel retaining position and for retracting said rod into an inactive position for a distance at least equal to the length of the tubing formed from a slug.

10. Apparatus as set forth in claim 9 in which pneumatically operated means is provided for rigidly retaining said rod in cooperation with said mandrel to retain the same against the force imparted thereto by said ram.

11. Apparatus as set forth in claim 7 in which:
   (a) said die structure has a slug receiving passage of at least twice the length of a slug,
   (b) the stroke of said ram is such as to require two reciprocations thereof to force a slug through and out of the passage therethrough, such forcing of the slug out of the passage requiring the presence of a second slug between the ram and the rearmost end of the slug being so forced.

12. Apparatus for producing tubular members suitable for use in forming cartridge casings, which comprises:
(a) a heating tank adapted to retain a liquid heating medium,
(b) means for introducing a succession of thick-walled tubular slugs into said tank and advancing the same through said tank,
(c) a slug retaining member in said tank at a level above the liquid heating medium therein,
 (i)) the wall of said tank having openings therein alined with a slug positioned against said retaining member
(d) a die positioned at one side of said tank alined with a slug held by said retaining member,
 (i) said die having a passage of annular cross-section extending therethrough,
 (ii) the initial portion of said passage having a cross-section substantially the same as that of said slug and having its outer surface differing in diameter from that of said slug by not more than ±.008,
 (iii) said passage in a region adjacent the discharge end of said die being of gradually increasing mean diameter and of gradually decreasing cross sectional area,
(e) a hollow ram alined with the retained slug on the opposite side of said tank,
 (i) said ram having an annular cross-section substantially the same as that of said slug,
(f) and means for reciprocating said ram,
 (i) said means imparting a movement to said ram sufficient to force said retained slug into said die passage and to cause completion of the movement of said slug through and out of said passage only when at least one succeeding slug is brought into the path of said ram.

13. Apparatus as set forth in claim 12 in which the length of said die and the stroke of said ram are such as to retain a slug, at the end of each reciprocation of said ram, in a position in which it is about to emerge from said die.

14. Apparatus as set forth in claim 12 in which:
(a) said die comprises a sleeve and a mandrel within said sleeve to provide said passage,
(b) means cooperating with said mandrel adjacent the discharge end of said die for retaining the mandrel against the force applied thereto by said ram as the latter forces a slug through and out of said passage,
(c) and means for reciprocating said mandrel retaining means to alternately present it in said mandrel retaining position as said ram forces the slug through said passage and to withdraw it from said mandrel retaining position after completion of said forcing movement of said ram.

15. Apparatus as set forth in claim 14 in which means are provided for stripping the tubing formed from a slug, after it is discharged from said die, from said means cooperating with said mandrel as said last-mentioned means is withdrawn.

16. Apparatus as set forth in claim 14 in which clamping means is provided for firmly holding said means cooperating with said mandrel in mandrel retaining position as said ram is operated to force a slug through said die passage.

17. Apparatus as set forth in claim 15 in which tube receiving means is provided for receiving the tubes as they are stripped from said means cooperating with said mandrel:
(a) said tube receiving means comprises a pair of conveyor belts having parallel runs spaced apart a distance slightly less than the outside diameter of a tube,
(b) means for advancing said belts to cause said runs thereof to move in opposite directions and at different speeds in relation to each other to impart a rolling action to said tubes as they are advanced and squeezed by said runs, and
(c) means for cooling said tubes as they are advanced by said belts.

18. Apparatus as set forth in claim 14 in which:
(a) said tank contains as the liquid heating medium a liquid which serves as a lubricant for the surfaces of the slug in relation to the surfaces defining said passage, and
(b) said mandrel is provided with longitudinally extending grooves in the region adjacent the entrance to said die, whereby said grooves are adapted to return any excess lubricant carried by the inner surface of a slug as it is forced into the passage of the die.

19. Apparatus as set forth in claim 18 in which said mandrel is provided with an inclined shoulder adjacent the inner ends of said grooves, said shoulder merging into a smooth cylindrical portion of said mandrel which extends downstream from said shoulder and has a slightly greater diameter than the grooved portion of said mandrel.

References Cited by the Examiner

UNITED STATES PATENTS

| | | | |
|---|---|---|---|
| 2,435,282 | 2/48 | Lester | 18—12 |
| 2,582,491 | 1/52 | Larsen. | |
| 2,941,240 | 6/60 | Distler | 18—555 |
| 3,008,187 | 11/61 | Slade | 18—55 |
| 3,034,172 | 5/62 | Sander et al. | |
| 3,074,115 | 6/63 | Albrecht et al. | |
| 3,103,170 | 9/63 | Dickey. | |

ROBERT F. WHITE, *Primary Examiner.*

MORRIS LIEBMAN, ALEXANDER H. BRODMERKEL, *Examiners.*

UNITED STATES PATENT OFFICE
CERTIFICATE OF CORRECTION

Patent No. 3,198,866

August 3, 1965

Robert A. Covington, Jr., et al.

It is hereby certified that error appears in the above numbered patent requiring correction and that the said Letters Patent should read as corrected below.

Column 2, lines 5 and 6, for "automatially" read -- automatically --; column 5, line 45, for "coures" read -- course --; line 71, for "slubs" read -- slugs --; column 7, line 21, for "minmum" read -- minimum --; column 8, line 40, for "Automatc" read -- Automatic --; column 9, line 33, for "43d" read -- 43b --; column 10, line 28, for "emobdiment" read -- embodiment --; column 14, line 32, for "area" read -- extra --; column 17, line 10, for "(i))" read -- (i) --; line 21, for "+.008," read -- +.008″, --.

Signed and sealed this 22nd day of March 1966.

(SEAL)
Attest:

ERNEST W. SWIDER
Attesting Officer

EDWARD J. BRENNER
Commissioner of Patents